(12) United States Patent
Williams

(10) Patent No.: US 7,467,867 B1
(45) Date of Patent: Dec. 23, 2008

(54) EYEWEAR RETENTION DEVICE

(76) Inventor: Ronald Williams, 411 Meadowbrook La., Birmingham, AL (US) 35213

( * ) Notice: Subject to any disclaimer, the term of this patent is extended or adjusted under 35 U.S.C. 154(b) by 0 days.

(21) Appl. No.: 12/142,323

(22) Filed: Jun. 19, 2008

Related U.S. Application Data

(60) Provisional application No. 61/051,539, filed on May 8, 2008.

(51) Int. Cl.
*G02C 3/00* (2006.01)
(52) U.S. Cl. .................... 351/156; 351/157; D16/339
(58) Field of Classification Search .......... 351/156, 351/157, 158, 41, 122, 123, 111; D16/339, D16/300, 311, 321, 335; 24/3.3
See application file for complete search history.

(56) References Cited

U.S. PATENT DOCUMENTS

| | | | |
|---|---|---|---|
| 2,704,961 A * | 3/1955 | Weil ........................... 351/157 |
| 4,133,604 A | 1/1979 | Fuller | |
| 5,575,042 A * | 11/1996 | Kalbach ........................ 24/3.3 |
| 6,644,808 B1 * | 11/2003 | Liu ............................. 351/156 |
| 6,941,619 B2 * | 9/2005 | Mackay et al. ................. 24/3.3 |
| 7,284,855 B2 * | 10/2007 | Bent ........................... 351/156 |

* cited by examiner

*Primary Examiner*—Hung X Dang
(74) *Attorney, Agent, or Firm*—Russell Carter Gaché; Maynard, Cooper & Gale, P.C.

(57) ABSTRACT

An eyewear retention device is disclosed that includes a length of resilient cord, such as cabling having a smooth plastic outer sheath, and terminating at each end in a tapered, rubberized retention tubing, and including retention end grommets molded against the ends of the cabling to prevent the slipping off of the retention tubing from the cabling. The combination of the resilient cord and the retention tubing produces a tensioned arc such that in addition to retaining eyeglasses to the vestment of a user when not in use, the retention device forms a suspended arc over the wear's upper torso such that the device does not contact the wear's upper torso or their vestment when donned over a wear's eyes.

24 Claims, 5 Drawing Sheets

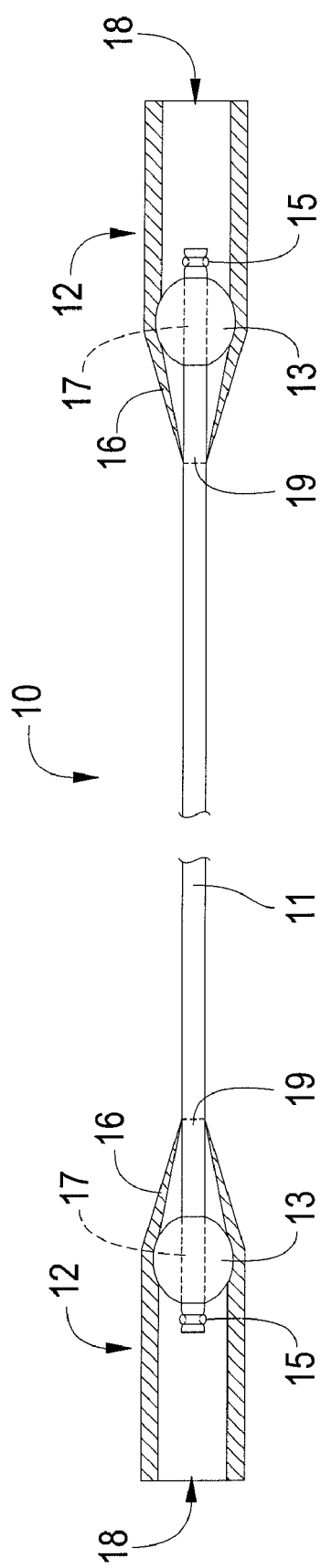

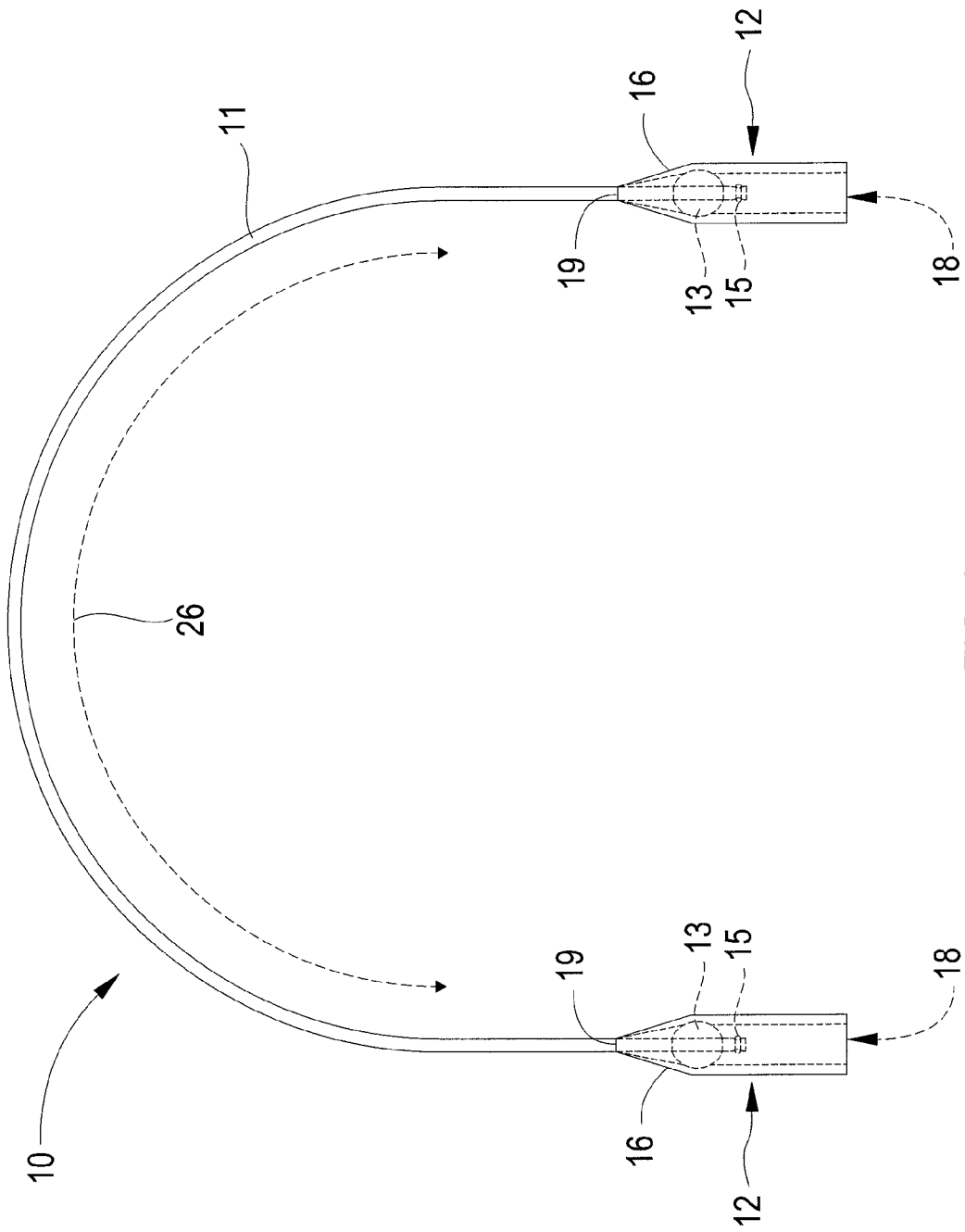

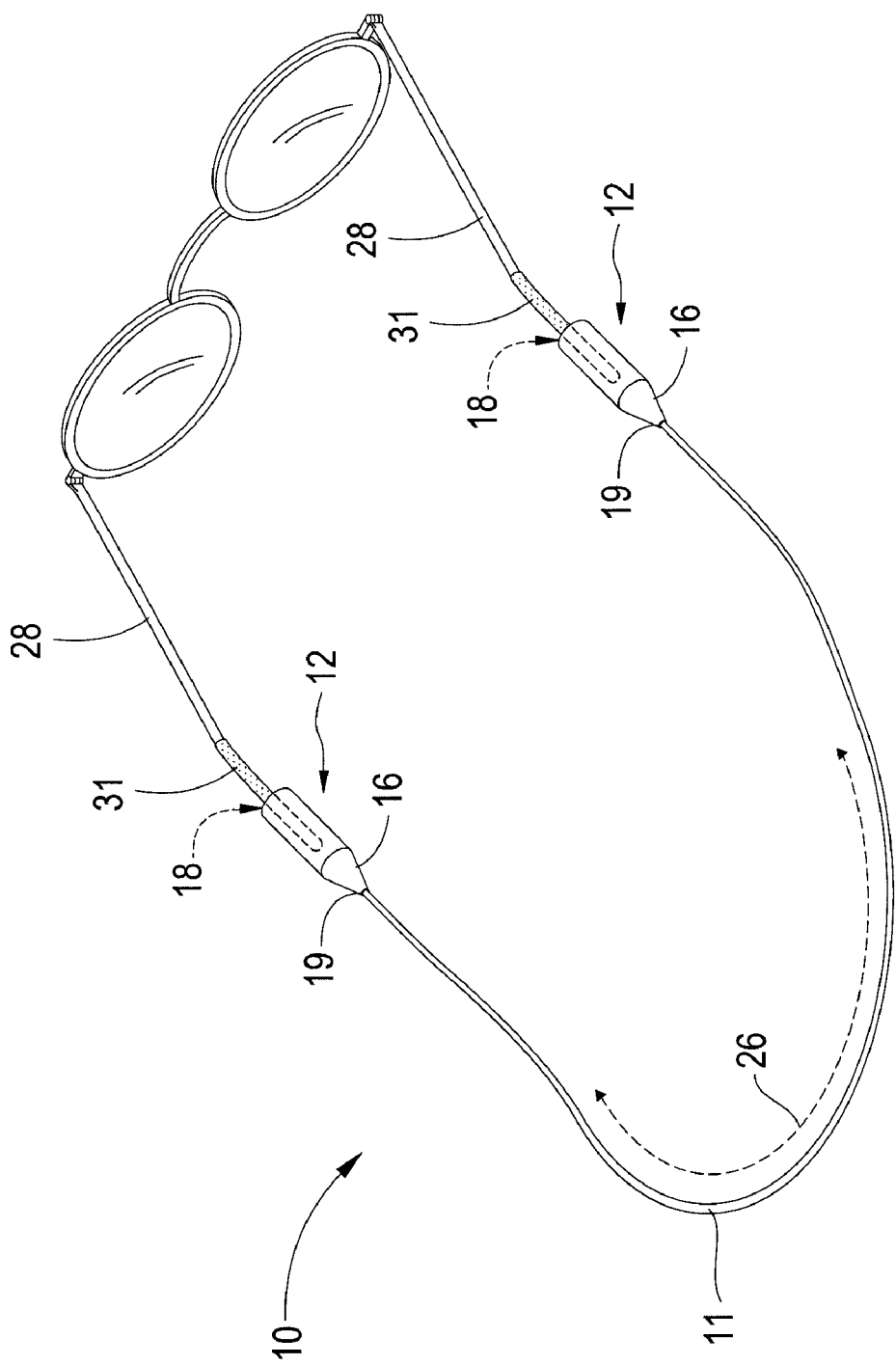

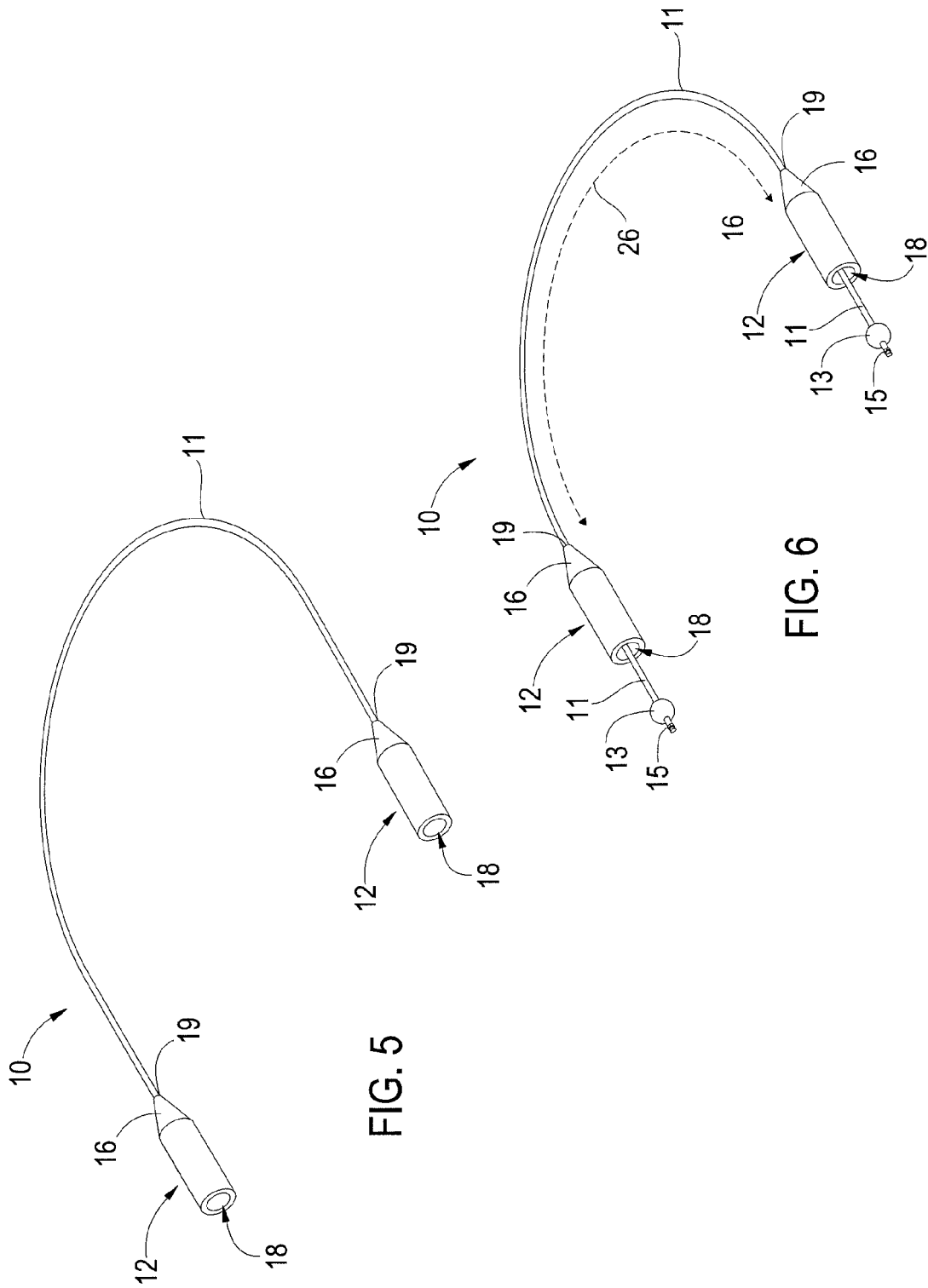

US 7,467,867 B1

EYEWEAR RETENTION DEVICE

FIELD OF INVENTION

The present invention relates generally to devices that retain eyewear on a user. In greater particularity the present invention relates to eyewear retainers that extend around rear of a wearer's head and upper neck.

BACKGROUND OF THE INVENTION

For many decades, probably longer, eyewear users have attached strings, cloth-based retainers, lightweight chains, and small ropes to eyeglasses to loosely retain them upon a wearer's upper torso when not positioned upon the wearer's head. Several decades ago, "Croakies" were introduced which are essentially neoprene retainer straps having a tubular portion into which eyeglass temples slip and a rear flat portion that extends around the rear of a user's head. Croakies immediately became popular with skiers, fisherman, and hunters who utilize polarized sunglasses and strongly tinted lenses to provide protection from intense glare and reflected light off water, ice, and snow, and other reflective surfaces in brilliant sunlight. Other types of lenses have also developed in popular culture to provide different types of tinting and appearances, and protective strategies from glare and the sun's damaging UV light have arisen. In response, a wide variety of colors and patterns have been introduced for Croakies and other of the aforementioned retainers.

However, with the advent of more stylized eyeglasses, and especially the darker tinted glass and plastic (e.g. polycarbonate) lenses, especially in non-prescription type sunglass lenses, wearer's are more frequently required to dismount their glasses in order to read close-up materials or inspect materials that are viewed in relatively low-light conditions. For example, it is quite common for a fishermen, skippers, or first mate deckhands to discard their glasses when going underneath the top deck of a boat to retrieve fishing tackle, read charts, or view other navigational aids during bright sunlight hours in order that they may be able to see the items they are utilizing. Hence, Croakies, and other types of retained devices have become popular for outdoorsmen and sportsmen alike seeking to provide the safety and proximity retention of their glasses while providing the flexibility to discard them quickly and utilize their eyes in relatively low-light conditions.

Unfortunately, Croakies and other types of eyewear retaining devices place a burden upon the wearer in that the older retention devices lay directly against the back of the neck or upper back portion, or around the collar of a shirt. Such locations are inconvenient because the retention device itself becomes potentially ensnared in the collar and/or buttons of the wearer's vestment which might hinder the re-application or the re-mounting of the glasses over the wearer's eyes. Further, for collarless vestments and similar, or even for a shirtless individual, the retention lanyards whether chains, string, or neoprene based retainers like Croakies, become coated with sweat, suntan lotion, protective emollients, and other types of debris on the upper torso of an individual. Such soiling makes the retention item unsightly and unattractive, thereby defeating the esthetic appeal that some of today's expensive eyeglasses exhibit. Over time, corrosion from salt and other types of chemicals on the outer layer of the skin can even corrode or diminish the retention effectiveness of the retention device, and also cause discoloration and fading of the retention device's colors and patterns.

Hence, what is needed is an eyeglass retention device that maintains the full utility of the retention objective for eyewear, while avoiding all of the difficulties of past eyewear retention devices.

SUMMARY OF INVENTION

An eyewear retention device is disclosed that includes a length of resilient cord, such as cabling having a smooth plastic outer sheath, and terminating at each end in a tapered, rubberized retention tubing, and also having retention end grommets molded against the ends of the cabling to prevent the slipping off of the retention tubing.

BRIEF DESCRIPTION OF THE DRAWINGS

An eyewear retention device incorporating the features of the apparatus are depicted in the attached drawings which form a portion of the disclosure and wherein:

FIG. 1a is a elevational drawing in partial section of a preferred embodiment of the invention;

FIG. 1b is an elevational drawing of one of the retention tubes of a preferred embodiment of the invention;

FIG. 1c is an end view of one of the retention tubes;

FIG. 3 is a plan view of a preferred embodiment of the invention showing the generalized semi-circular shape and retention tubing positioned against the end stop grommets;

FIG. 4 is a perspective view of the invention placed upon the end portions of the temples of a typical pair of eyeglasses showing the general placement of the temples inserted within the retention tubing;

FIG. 5 is an end perspective view of a preferred embodiment of the invention; and, FIG. 6 is a plan view of the invention showing the retention tubing repositioned along the retention cable to expose the crimped end grommets that prevent the retention tubing from detaching from the retention cabling.

DETAILED DESCRIPTION OF THE DRAWINGS

Figure 2A:
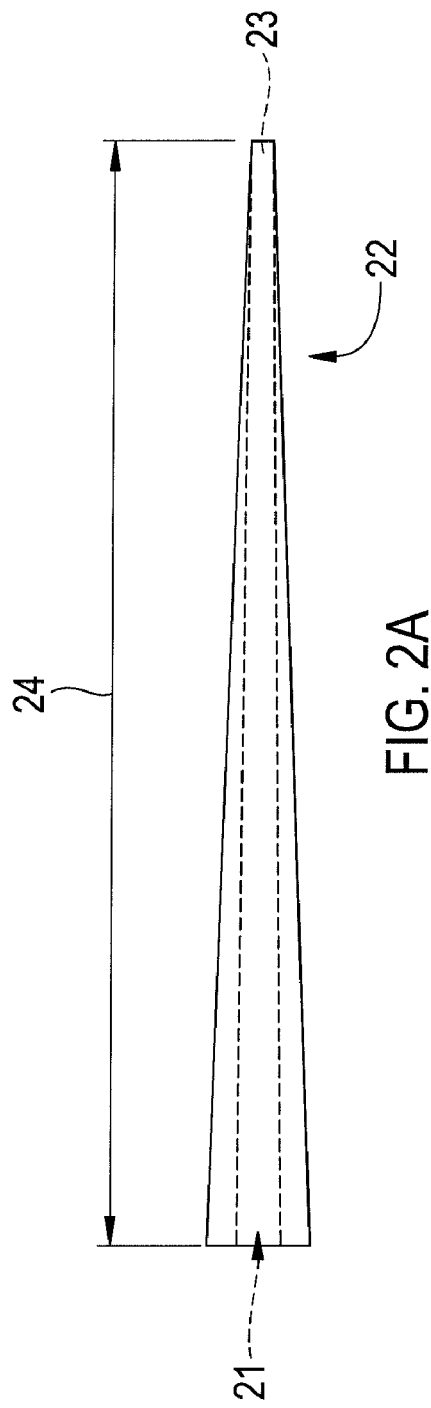
FIG. 2a is an elevational drawing in section of a highly tapered embodiment of one of the retention tubes of the invention.

Referring to the drawings for a better understanding of the function and structure of the invention, FIGS. 1a-c shows the invention 10 including a cable 11 having a tightly wound wiring structure and coated with a relatively frictionless plastic outer insulation. The cable 11 is of sufficient diameter and internal wiring resiliency such that its shape is resiliently biased toward a zero axis deflection orientation. In other words, the cable does not easily exhibit deflection memory, as one would find in a solid copper or aluminum wire of equal diameter, and resists attempts to deform the cable and maintains a linear shape in all weather conditions. Invention 10 includes retention tubes 12 at each end of cable 11. Each tube 12 includes a temple retention opening 18 having a sufficient diameter to pass over the end portions of a typically sized eyeglass temple. Retention tube 12 opening 18 is also sized to exhibit a certain friction characteristics to allow easy sliding of the retention tubing 12 onto the end portion of a typical eyeglass temple, while providing sufficient frictional qualities to avoid easy removal. Generally, the retention tubing 12 consists of flexible and resilient rubber, or like compound, and has low friction qualities on its exterior. The retention tubing 12 includes a tapered portion 16 defining a cable aperture 19 cooperatively sized to insert the end of the cable 11 while maintaining continual circumferential contact around the cabling. Once the end of the cable has been passed through aperture 19 and emerges through opening 18, a bead or ball bearing 13 is slid onto the end of cable 11 through a channel 17 traversing the center of bead 13. A crimp or grommet 15 is then applied to the cable to prevent bead 13 from slipping off cable 11. The crimp or grommet 15 is compressed using known methods to engage and permanently affix to the cable, thereby forming the stop at the end of cable 11. The bead may be made of plastic, metal, or ceramic, and the diameter of channel 17 should be sized to allow cable 11 to freely pass through bead 13 allowing the cable 11 to rotate and translate through the bead 13. Grommet 15 may be made of any material having suitable deformation characteristics to permanently affix it to cable 11, but copper or brass is preferred due to its benign and low oxidation qualities. When affixed to the end of the cable 11, the grommet 15 bead 13 combination prevents the passage of the end of cable 11 through aperture 19. Once the bead and grommet combination has been secured to the end of cable 11, tension may be applied to cable 11 and the cable and bead-grommet combination may be carefully pulled through opening 18 to secure the bead 13 against the internal conjuncture tapering 16 and the sidewalls of retention tube 12. Upon the engagement of bead against the internal sidewalls of tapered portion 16, bead 13 will exert circumferential pressure upon the upper portion of tapered portion 16 to secure the bead 13 within the retention tube 12 and, thereby, the end portion 14 of cable 11 within the retention tubing. The assembly of the retention tube 12 and grommet-bead combination is identical for each end of cable 11.

Figure 2B:
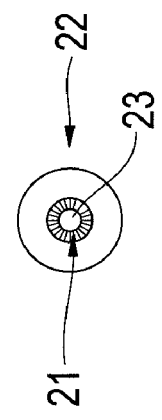
FIG. 2b is an elevational drawing of the highly tapered embodiments of one of the retention tubes of the invention.
Figure 2C:
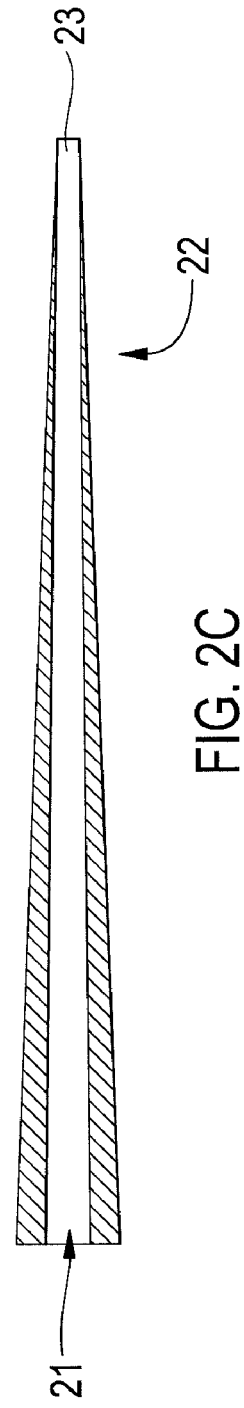
FIG. 2c is an end view of one of the highly tapered embodiments of one of the retention tubes of the invention.

Referring now to FIGS. 2a-c, one may see a second embodiment of retention tube 12. To accommodate some glasses having relatively thin temples, retention tube 22 may be reshaped to include a fully tapered conical structure from opening 21 to aperture 23. As may be seen, a hollow interior of retention tube 22 is sized into an elongated conical shape so that temples of more slender sizes may be inserted within opening 21 and slid along the interior of retention tube 22 until sufficient circumferential frictional force is applied to the end of the inserted temple to stop the progress of the temple within the hollow interior of the retention tube 22. This shape allows for varying applicability for different size temples and also provides additional retention security by increasing circumferential friction on temples inserted within the hollow interior of 22. As before, the grommet-bead combination (not shown) are affixed to the end of cable 11 and pulled through opening 21 until bead 13 engages the interior of 22 toward adjacent to aperture 23.

Referring now to FIG. 3, one may see the invention 10 conformed to a substantially semi-circular or arc shape 26. Due to the resiliency of the cable 11, retainer 10 maintains the arc shape 26 when installed upon the temples of eyeglasses.

Referring now to FIG. 4, as shown, retention tubing 12 is inserted over end portions of the temples of the shown eyeglasses 27 until end portions of the temples 31 are fully engaged within the interior of the retention tube 12. A sufficient length of cabling 11 is provided to allow for the donning of the combination of the invention 10 and eyeglasses 27, or sunglasses as the case may be, over a wearer's head while in place, and is sized to accommodate baseball caps and similar sun visor protective head gear.

Importantly, the resiliency of the cabling 11 in combination with the secure structure of retention tubing 12, with its inherent resiliency, creates an internal resilience within cabling 11 such that the cable maintains an elevated arc position above a wearer's rear neck and lower head area. Therefore, due to the internal resiliency of the cable, and the positioning of the tubing on the eyeglass temples, the cabling does not contact a wearer's back or collar, or other vestment worn by a user, but instead maintains a spaced position extending backwards from the user. Further, the angle of the retention tubing, and/or the conical tapered portion, may be altered to allow for the redirection of the cable portion into a superior elevated position over a wearer upper back and neck. For example, some end portions of eyeglass temples extend downward sharply over a wearer's ears. An angled retention tube allows for correction of this downward angle to normalize the direction of the cable 11 backward to maintain a suspended arc in the cable as it extends rearwardly from said user's head such that the cable does not contact the wearer or his/her vestment.

Referring now to FIG. 6, one may see that a pair of beads 13 have been slid over the ends of the cabling 11 with the retention tubing 12 displaced away from the copper crimps or grommets 15 for illustration purposes to expose cable end portions 14. As shown, grommets 15 have been compressed (e.g. crimped) such that grommet 15 may not be displaced in either direction along cable 11, thereby preventing bead 13 from traversing off the end of the cable 11.

While I have shown my invention in one form, it will obvious to those skilled in the art that is not so limited but is susceptible of various changes and modifications without departing from the spirit thereof. For example, the inventor envisions that the wire cable 11 may be replaced by a resilient plastic or carbon fiber replacement member exhibiting resiliency characteristics similar to a plastic coated wound cable.

Having set forth the nature of the invention, what is claimed is:

1. An eyewear retention device, comprising:
   a. a resilient cable;
   b. a pair of temple retention tubes disposed around the ends of said cable;
   c. an end bead slidably encircling each end of said cable and a grommet affixed to the end of said cable thereby preventing said bead from sliding off said cable; and,
   d. wherein each said retention tube includes a cylindrical portion and a tapered portion on one end of said cylindrical portion, and wherein an end portion of said cable is disposed within said retention tube such that said bead is held against the interior walls of said tapered portion and said cable extends through said tapered portion to said other retention tube.

2. The eyewear retention device as recited in claim 1, wherein said bead consists of material selected from the group of metal, plastic, or ceramic.

3. The eyewear retention device as recited in claim 2, wherein said grommet is made of copper.

4. The eyewear retention device as recited in claim 3, wherein said cable comprises an arc suspended above a wear's vestment when said eyewear retention device is donned by a user over their eyes.

5. The eyewear retention device as recited in claim 4, wherein said tapered portion comprises a hollow frustum.

6. The eyewear retention device as recited in claim 1, wherein said cable comprises an arc suspended above a wear's vestment when said eyewear retention device is donned by a user over their eyes.

7. The eyewear retention device as recited in claim 1, wherein said cable is plastic coated.

8. The eyewear retention device as recited in claim 1, wherein said retention tube is rubber.

9. The eyewear retention device as recited in claim 1, wherein said tapered portion comprises a hollow frustum.

10. The eyewear retention device as recited in claim 9, wherein retention tubes are sufficiently sized to cover a eyeglass temple end portion such that elastomeric tension is developed within said retention device to cause said cable to extend rearwardly relative to a wearer in a suspended arc over the upper torso of said wearer without contacting said wearer or their vestment when said retention device is donned over said wearer's eyes.

11. The eyewear retention device as recited in claim 10, wherein said tapered portion includes an angle that normalizes the direction of said cable rearward from said user's head in response to a curved end portion of an eyeglass temple.

12. The eyewear retention device as recited in claim 1, wherein said tapered portion includes an angle that normalizes the direction of said cable rearward from said user's head in response to a curved end portion of an eyeglass temple.

13. An eyewear retention device, comprising:
   a. a resilient cord;
   b. a pair of temple retention means disposed around the ends of said cord;
   c. an end bead slidably encircling each end of said cord and prevented from sliding off said cord; and,
   d. wherein each said retention means includes a tapered portion on one end, and wherein each cord includes an end portion disposed within said retention means such that said bead is held against the interior walls of said tapered portion and said cable extends through said tapered portion to said other retention means.

14. The eyewear retention device as recited in claim 13, wherein said bead consists of material selected from the group of metal, plastic, or ceramic.

15. The eyewear retention device as recited in claim 14, further including a crimp to prevent said bead from sliding off said cord.

16. The eyewear retention device as recited in claim 15, wherein said cord forms an arc suspended above a wear's vestment when said eyewear retention device is donned by a user over their eyes.

17. The eyewear retention device as recited in claim 16, wherein said tapered portion comprises a hollow frustum.

18. The eyewear retention device as recited in claim 17, wherein said cord is plastic coated.

19. The eyewear retention device as recited in claim 18, wherein said retention means is comprised of rubber.

20. The eyewear retention device as recited in claim 13, wherein said retention means comprises a hollow frustum.

21. The eyewear retention device as recited in claim 20, wherein said retention means are sufficiently elongated such that said retention means substantially covers an eyeglass temple and elastomeric tension is developed within said retention means to cause said cord to extend rearwardly relative to a wearer in a suspended arc over the upper torso of said wearer without contacting said wearer or their vestment.

22. The eyewear retention device as recited in claim 21, wherein said retention means includes an angle to normalize the direction of said cord rearward from said user's head in response to a curved end portion of an eyeglass temple.

23. The eyewear retention device as recited in claim 13, wherein said tapered portion includes an angle to normalize the direction of said cord rearward from said user's head in response to a curved end portion of an eyeglass temple.

24. An eyewear retention device, comprising:
   a. a resilient member;
   b. a pair of temple retention tubes disposed around the ends of said resilient member;
   c. an end grommet encircling each end of said resilient member compressed thereupon;
   d. a bead slidably encircling each end of said resilient member; and,
   e. wherein each said retention tube comprises a tubular frustum, and wherein an end portion of said resilient member is disposed within said retention tube such that said bead is held against the interior walls of said retention tube, and wherein said resilient member extends through the smaller diameter end of said retention tube.

* * * * *